(12) United States Patent
Razaghi et al.

(10) Patent No.: US 11,797,966 B2
(45) Date of Patent: *Oct. 24, 2023

(54) TAMPER RESISTANT DEVICE

(71) Applicant: BLOCK, INC., Oakland, CA (US)

(72) Inventors: Mani Razaghi, San Francisco, CA (US); Brett Andler, San Francisco, CA (US)

(73) Assignee: Block, Inc., Oakland, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/365,507

(22) Filed: Jul. 1, 2021

(65) Prior Publication Data

US 2021/0326827 A1 Oct. 21, 2021

Related U.S. Application Data

(62) Division of application No. 15/846,947, filed on Dec. 19, 2017, now Pat. No. 11,087,301.

(51) Int. Cl.
*G06F 21/86* (2013.01)
*G06Q 20/20* (2012.01)
*G07G 1/00* (2006.01)

(52) U.S. Cl.
CPC ........... *G06Q 20/206* (2013.01); *G06F 21/86* (2013.01); *G06Q 20/204* (2013.01); *G07G 1/0018* (2013.01)

(58) Field of Classification Search
CPC .. G06Q 20/206; G06Q 20/204; G06Q 20/202; G06Q 20/3223; G06Q 20/3278; G06Q 20/34; G06Q 20/353; G06F 21/86; G07G 1/0018; G07G 1/0009; G07F 7/088; G07F 7/0893

See application file for complete search history.

(56) References Cited

U.S. PATENT DOCUMENTS

| | | | |
|---|---|---|---|
| 9,230,143 B2 | 1/2016 | Wade et al. | |
| 10,057,395 B1 | 8/2018 | Wagstaff et al. | |
| 2006/0255128 A1* | 11/2006 | Johnson | G06Q 20/202 235/383 |
| 2014/0001263 A1 | 1/2014 | Babu et al. | |
| 2016/0171486 A1* | 6/2016 | Wagner | G06Q 20/326 705/39 |
| 2019/0095655 A1* | 3/2019 | Krawczewicz | H04L 9/3234 |
| 2021/0326541 A1 | 10/2021 | Razaghi et al. | |

OTHER PUBLICATIONS

Non-Final Office Action dated Jul. 22, 2022, for U.S. Appl. No. 17/360,473, of Razaghi, M., et al., filed Jun. 28, 2021.

* cited by examiner

*Primary Examiner* — Peter Ludwig
*Assistant Examiner* — Reva R Moore
(74) *Attorney, Agent, or Firm* — Polsinelli PC

(57) ABSTRACT

Aspects of the technology provide systems, devices and methods for filling design voids within an assembled electronic device with tamper solids in order to prevent and/or detect a tampering with the electronic device to gain unauthorized access to the electronic device to steal information.

16 Claims, 12 Drawing Sheets

TAMPER RESISTANT DEVICE

CROSS-REFERENCE TO RELATED APPLICATIONS

This application claims priority to and is a divisional of U.S. patent application Ser. No. 15/846,947, filed on Dec. 19, 2017, entitled "TAMPER RESISTANT DEVICE," the entirety of which is herein incorporated by reference.

BACKGROUND

1. Technical Field

The subject application relates to detection of tampering with a device having circuitry configured to receive personal information from other devices for purposes of conducting a financial transaction.

2. Introduction

A point of sale ("POS") device can include various components, such as a processor, a card reader, a network connection interface, and a receipt printer. Another variation of such POS device can include a handheld device (e.g., a mobile phone, a tablet, a laptop, etc.) coupled to a card reader (typically via an audio jack of the handheld device and/or a receipt printer. Card readers are typically built to read transaction information from cards, such as credit cards or debit cards.

When such POS devices are assembled, it is common that the resulting assembly would have air-filled voids in between the components (e.g., various circuitry) inside the assembly. For example, a card reader assembly would have various components such as a microcontroller, a wake-up circuit, an near field communication (NFC) reader, etc., installed on a printed circuit board and one or more areas between such components and the housing of the card reader can be air-filled/void.

Such air-filled portions/areas present a chance to hackers to insert bugs therein to turn the device into a skimmer and obtain financial/personal information of customers.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

As described above, assembled POS devices and components thereof are susceptible to malicious surveillance in an attempt to extract sensitive user information such as transaction card information, passwords, and personal identification numbers ("PINs").

The subject technology relates to reducing and/or eliminating air-filled gaps (which may be referred to as design voids) such that any attempted tampering with such POS devices and/or any one of components thereof (e.g., a card reader) by inserting a malicious instrument into a design void can be detected and prevented.

Hereinafter, several embodiments of POS devices and systems they are used in will be described with reference to FIGS. 1 and 2. Thereafter, examples for reducing and/or eliminating vulnerabilities from design voids will be described with reference to FIGS. 3-8. Lastly, FIG. 9 and the accompanying description provide a description of system components that be implemented as a POS device. We now turn to the discussion of example POS devices and systems.

Figure 1:
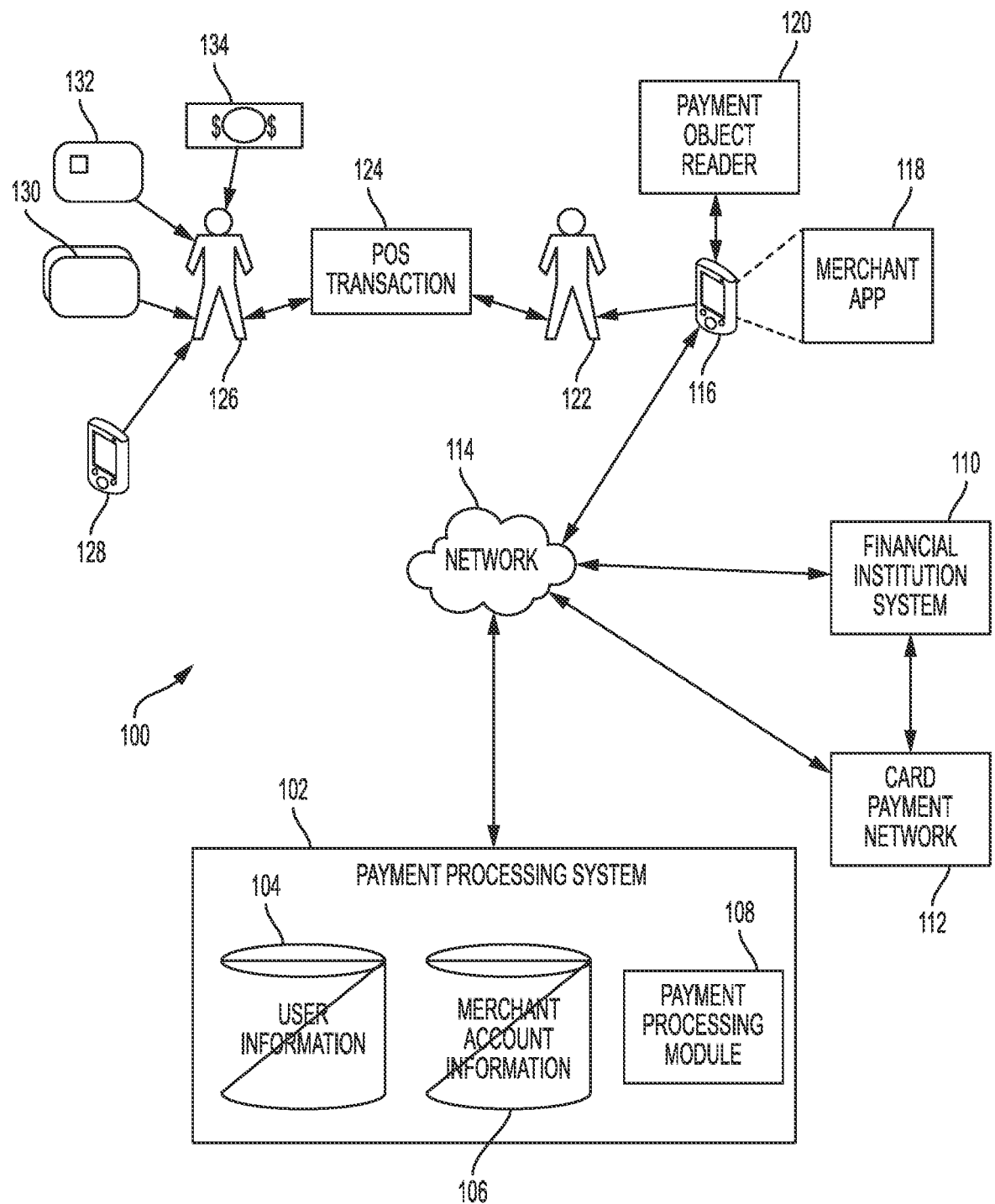
FIG. 1 illustrates architecture of a payment communication system, according to an aspect of the present disclosure.

FIG. 1 illustrates architecture of a payment communication system, according to an aspect of the present disclosure. More specifically, FIG. 1 illustrates example architecture of payment communication system 100 for enabling point-of-sale (POS) transactions between merchants 122 and buyers 126. In the example of FIG. 1, buyer 126 can use any of a variety of payment objects, such as payment cards 130, 132, user device 128 or cash 134 when participating in POS transaction 124 with a merchant 122. A buyer 126 can typically have payment cards 130, 132 such as credit cards, debit cards, prepaid cards, and the like, that buyer 126 can use for conducting POS transaction 124. In some embodiments, payment cards 130 can include one or more magnetic stripes for providing payment object and buyer information when swiped in a payment object reader 120 communicatively coupled to merchant device 116. In some embodiments, other types of payment objects can be used, for example smart cards 132 having a built in integrated circuit including a memory chip (e.g. EMV payment objects), a radio frequency identification tag (e.g. near field communication enabled objects), and the like. In some embodiments, user 126 can use user device 128 (e.g., a mobile device, a tablet, etc.) to conduct NFC payment transactions through communication between the user device 128 and the payment object reader/transmitter device 120.

The payment communication system 100 in the example of FIG. 1 illustrates a merchant device 116 associated with the merchant 122 that participates in the payment service provided by the service provider of payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Merchant device 116 can include an instance of a merchant application 118 executed on merchant device 116. Merchant application 118 can provide POS functionality to enable the merchant 122 to accept payments at a POS location using merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that merchant 122 operates a food truck, is a street vendor, a cab driver, or has an otherwise mobile business, e.g., in the case of merchants who sell items at buyers' homes, buyers' places of business, etc.

Merchant device 116 is communicatively coupled to a payment object reader 120, either by direct connection, for example through an audio jack of the mobile phone connected to an audio plug of the payment object reader 120, or through wireless connection, such as WiFi, BlueTooth, BLE (Bluetooth low energy), NFC, or other appropriate short-range communication. Short-range communication as used herein refers to communication protocols having a generally short range of communication (less than 100 meters in some embodiments), such as NFC communication, RFID (radio frequency identification) tags, or Wi-Fi, etc. The payment object reader can read data from a magnetic stripe card or an EMV chip-type card and communicate the data to merchant device 116. The payment object reader can also read data from an NFC device and communicate the data to merchant device 116.

As used herein, a financial transaction is a transaction that is conducted between a customer and a merchant at a point-of-sale. When paying for a financial transaction, the customer can provide the merchant with cash, a check, or a debit or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

Accordingly, merchant 122 and buyer 126 can conduct a POS transaction 124 by which buyer 126 acquires an item or service from merchant 122 at a POS location. The merchant application 118 on merchant device 116 can send transaction information to payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some examples, payment processing system 102 is configured to send and receive data to and from the user device and merchant device 116. For example, the payment processing system 102 can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some examples, payment processing system 102 can also be configured to communicate with a computer system of card payment network 112, e.g., MasterCard®, VISA®, etc., over the network, or over a different network, for example, to conduct electronic financial transactions. The computer system of the card payment network can communicate with a computer system of financial institution system 110, e.g., a bank. There can be computer systems of other entities, e.g., the card acquirer, between payment processing system 102 and the computer system of the card issuer.

Payment processing system 102 can then communicate with the computer system of a card payment network 112 to complete an electronic financial transaction for the total amount to be billed to the customer's financial account. Once the electronic financial transaction is complete, payment processing system 102 can communicate data describing the payment transaction to the user device, e.g., an electronic receipt, which can, for example, notify the customer of the total amount billed to the user for the payment transaction with the particular merchant.

In some examples, payment processing system 102 can also include payment card profiles stored with user accounts in user information database 104. Such payment card profile can be utilized for card-less payment transactions wherein a user 122 is not required to present a payment card, and instead can authorize the payment processing system to process a payment to a merchant using a device such as device 128.

To accept electronic payments using the POS system 100, the merchant 122 typically creates a merchant account with payment processing system 102 by providing information describing the merchant including, for example, merchant name, contact information (e.g., telephone numbers, the merchant's address, and one or more financial accounts to which funds collected from buyers will be deposited). This merchant information can be securely stored by payment processing system 102, for example, as merchant account information 106 in a secure database. Further, the merchant information can include a merchant profile created for each merchant. The merchant profile can include information about merchant 122 and transaction information associated with transactions conducted by the merchant.

Payment processing system 102 enables a service provider to provide a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. Payment processing system 102 includes payment processing module 108 that receives transaction information for processing payments made through merchant application 118. For example, the payment processing module 108 can receive transaction information, such as an amount of the transaction, and can verify that particular payment card 130, 132 can be used to pay for the transaction, such as by contacting a card clearinghouse of card payment network 112. Furthermore, in some examples, payment processing module 108 can redirect payment information for transactions to be made using payment cards 130, 132 to a bank, or other financial institution system 110. In other embodiments, merchant device 116 can communicate directly with an appropriate card payment network 112 or financial institution system 110 for approving or denying a transaction using a particular payment card 130, 132 for a POS transaction 124.

Network 114 can be a conventional type, wired or wireless, and can have numerous different configurations including a star configuration, token ring configuration, or other configurations. Furthermore, network 114 can include an intranet, a local area network (LAN), a wide area network (WAN) (e.g., the Internet), and/or other interconnected data paths across which multiple devices can communicate. In some embodiments, network 114 can be a peer-to-peer network. Network 114 can also be coupled with or include portions of a telecommunications network for sending data using a variety of different communication protocols. In some embodiments, network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more than one network 114 can connect these entities. The payment system, the merchant device, and the user device can communicate over the network using wired or wireless connections, or combinations thereof.

In some examples, payment processing system 102 is configured to accept card-less payment transactions from customers (e.g. customer 126). As used herein, a card-less payment transaction is a transaction conducted between the customer and a merchant at the point-of-sale during which a financial account of the customer is charged without the customer having to physically present a financial payment card to the merchant at the point-of-sale. In some forms of card-less payment transactions, the merchant receives at the point-of-sale details of the financial account via mobile device 128 presenting payment information to merchant 122 by communicating with payment object reader 120, e.g. NFC transactions. In other forms of card-less payment transactions, the merchant need not receive any details about the financial account at the point-of-sale, e.g., the credit card issuer or credit card number, for the transaction to be processed. Instead, such details can be stored at user information 104 of payment processing system 102 and provided to merchant 122 (such card-less payment transactions herein are referred to as card-on-file transactions). Generally, when a customer and a merchant enter into an electronic financial transaction, the transaction is processed by transferring funds from a financial account associated with the user account to a financial account associated with the merchant account.

Figure 2:
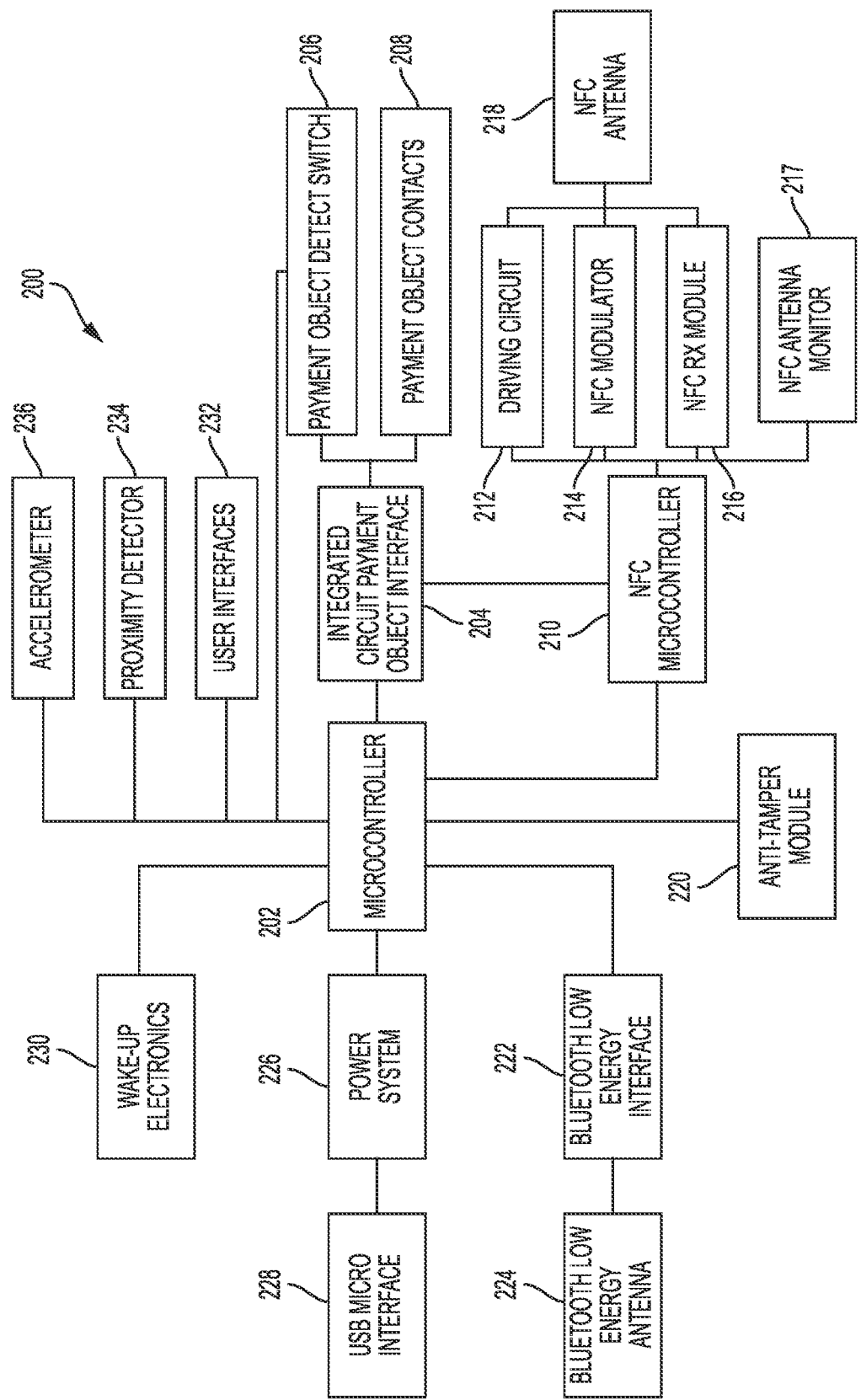
FIG. 2 illustrates a payment object reader/transmitter device, according to an aspect of the present disclosure.

FIG. 2 illustrates a payment object reader/transmitter device, according to an aspect of the present disclosure. Payment object reader 200 can be the same as payment object reader 120 of FIG. 1. Payment object reader 200 can include microcontroller 202 configured to manage functions between various components within the payment object reader 200. Coupled to microcontroller 202 is integrated circuit payment object interface 204. Integrated circuit payment object interface 204 is connected to payment object detect switch 206 and payment object contacts 208. Payment object contacts 208 is configured to provide electrical connectivity between the contact pads of an integrated circuit enabled payment object and integrated circuit payment object interface 204. Furthermore, payment object detect switch 206 is configured to indicate when a payment object is inserted into payment object reader 200. Payment object detect switch 206 may be any suitable switch, electrical, mechanical, or otherwise, and in some embodiments may be integrated with payment object contacts 208. In situations where payment object detect switch 206 indicates that a payment object has been inserted into payment object reader 200, integrated circuit payment object interface 204 creates a pathway between microcontroller 202 and payment object contacts 208. As such microcontroller 202 can read data from the payment object contacting payment object contacts 208.

In some examples, microcontroller 202 transmits the data read from the payment object contacting payment object contacts 208, by using the NFC antenna 218 under the control of the NFC microcontroller 210.

Payment device 200 may also include a near field communication (NFC) microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, driving circuit 212 may include an H-bridge, an amplifier, a filter and/or a matching circuit. A switch 213 can be coupled on a first pole of the switch to the antenna 218 and on the second pole to the driving circuit, such that when the device is in the first receiver mode, the switch 213 is closed and the antenna is driven by the driving circuit. When switch 213 is open, the antenna 218 is not driven by driving circuit 212 and operates in a transmission mode. In some embodiments, switch 213 can be replaced with a switch within driving circuit 212, such as a JFET or MOSFET switch under the control of the microcontroller 202 or NFC microcontroller 210. Furthermore, in some embodiments NFC RX module 216 may include an op-amp, a filtering and conditioning circuit and/or a rectifier, such as a full wave bridge rectifier. Additionally, NFC modulator 214 may be, for example, a type-B modulator. In instances where it is desired to read a NFC enabled payment object, or a NFC enabled payment object is determined to be in proximity to payment object reader 200, NFC microcontroller 210 may be configured to drive NFC antenna 218 via driving circuit 212 to induce a magnetic field capable of being modulated by the NFC enabled payment object. From here, the modulated magnetic field signal may be converted into a digital signal that NFC microcontroller 210 can interpret via NFC RX module 216. On the other hand, when it is desired to transmit data via NFC antenna 218, NFC microcontroller 210 may be configured to disable driving circuit 212 and transmit data using the NFC protocol by instructing NFC modulator 214 to modulate the magnetic field to which NFC antenna 218 is operatively coupled. In some embodiments, there can be a switch within NFC modulator 214 to turn on or off the load applied to the antenna. The switch can be under the control of microcontroller 202.

Microcontroller 202 receives payment data read by integrated circuit payment object interface 204 via payment object contacts 208, or alternatively from a magnetic stripe reader reading payment data from a magnetic stripe card. The payment data received at microcontroller 202 is stored, either temporarily or permanently, in memory of payment device 200. The payment data stored in memory can then be transmitted via NFC antenna 218. In some embodiments, microcontroller 202 can receive and permanently store payment information so that payment object reader 200 acts as a payment object that does not require a payment card or other payment object to be present. Payment device 200 is capable of communicating using Bluetooth, and is thus able to pair with a mobile device to obtain payment object information from a phone that has Bluetooth capabilities but does not have NFC payment capabilities.

To supply power to the components within payment device 200, power system 226 is provided. In some embodiments, power system 226 may include a battery. Coupled to power system 226 is USB micro interface 228 configured to receive a USB micro jack, although other types of connectors may be utilized. In certain embodiments, connection of a jack to USB micro interface 228 can activate a switch within power system 226 to override power supplied by the battery. This allows for battery power to be conserved for situations where external power cannot be provided. Furthermore, power system 226 may also include a battery charger to allow the battery to be charged when external power is supplied via USB micro interface 228. Payment device 200 also includes wake-up electronics 230 configured to wake-up payment object reader 200 from a low-power state to an active state in response to detection of a payment object. In some embodiments, wake-up electronics 230 can also power down payment object reader 200 to a low-power state after a predetermined amount of time or after completion of a communication.

Payment device 200 illustrated in FIG. 2 further contains a Bluetooth low energy (BLE) interface 222 and a BLE antenna 224 to enable Bluetooth communications. In addition, payment object reader 200 includes anti-tamper module 220 configured to prevent unauthorized tampering with the device and possible theft or interception of payment information. In certain embodiments, anti-tamper module may include a wire mesh enclosed within payment object reader 200, as will be described below.

Payment device 200 also includes user interfaces 232 to enhance the user experience. User interfaces 232 can include, but are not limited to, LED indicators, buttons and speakers. In some embodiments, speakers and LED indicators can be used to present audio and visual identifiers of transaction and device status. In addition, buttons may be configured to power payment object reader 200 on or off, operate the device or reset the device.

Payment object reader 200 also includes sensors. As illustrated in FIG. 2, the example sensors are useful in informing payment object reader 200 about its current environment, use, or state such as accelerometer 236 and proximity detector 234.

Figure 3:
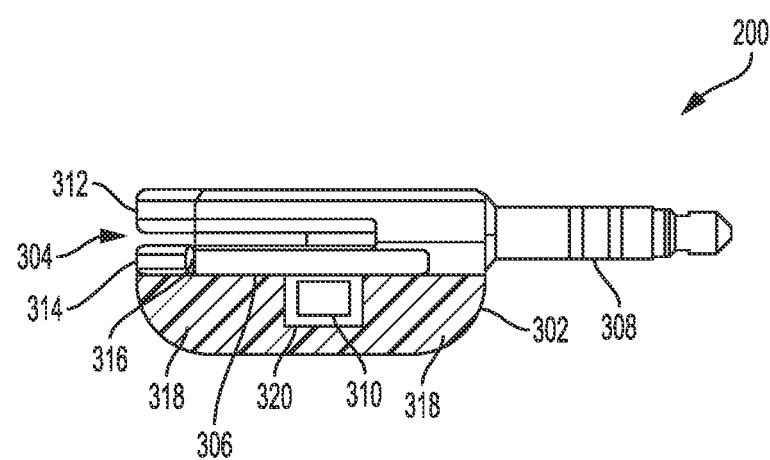
FIG. 3 illustrates components a payment object reader, according to an aspect of the present disclosure.

FIG. 3 illustrates components a payment object reader, according to an aspect of the present disclosure.

As shown in FIG. 3, payment object reader 200 includes at least a housing 302 having a slot 304, a card reader 306 embedded on a wall of slot 304, a signal plug 308 extending out from housing 302, and a printed circuit board (PCB) 310. In one example, payment object reader 200 connects to merchant device 116 via signal plug 314.

In one example, slot 304 has lips (edges) 312 and 314 and there may be opening 316 between PCB 306 and lower lip 312. Slot 304 is configured to maintain contact between card reader 306 (which may also be a magnetic read head, NFC chip, etc., as described above) and the magnetic stripe of the financial transaction card (e.g., card 132 shown in FIG. 1) during a swipe. A signal resulting (generated) from the contact is sent to electronic components installed on PCB 310 for processing and transmission to merchant device 116 for decoding, processing, etc., as described above. In one example, slot 304 has a width of no greater than 1 mm. The width of slot 304 is sufficient to enable a successful swiping of the financial transaction card, while producing the signal. It is sized to enable the successful swipe without creating sufficient torque between signal plug 308 or output jack and the read head or at the merchant device 116 to cause damage due to excessive torque.

PCB 310 can have electronic components of payment object reader 200 installed thereon including but not limited to, microcontroller 202, integrated circuit payment object interface 204, NFC microcontroller 210, wake-up electronics 230, etc., as described above with reference to FIG. 2. As shown in FIG. 2, there is a security housing 320 within housing 302 that covers PCB 310. This will be further illustrated and described with reference to FIGS. 4-8. Inclusion of security housing 320 is optional. In one example, there can be no security cage and instead PCB 310 sits within housing 302 and connected to card reader 206.

Furthermore, FIG. 3 illustrates empty space 318 (shown using diagonal lines). As discussed above, design voids can be used to place malicious instruments in payment object reader 200 for purposes of stealing personal and financial information of customers and merchants. Empty space 318 and opening 316 represent examples of such design voids. Furthermore and as will be described below with reference to FIGS. 4-8, there can be design voids between security housing 320 and PCB 310 placed therein.

Having described various examples of POS devices and components thereof as well as systems in which they are used, we now turn to a discussion of addressing air-filled spaces (design voids) inside such POS devices, payment object readers, etc.

Referring back to FIG. 3, design voids such as empty space 318 and opening 316 can be created between card reader 306, PCB 310 and housing 302, once payment object reader 200 is assembled.

It is possible for a scammer to utilize these design voids to insert bugs/malicious instruments into payment object reader 200 (e.g., by drilling through housing 302, disassembling (opening) housing 302, etc.). As is known, a bug may be used to tap signals to steal unencrypted information (e.g., personal and financial information of customers) off of signals generated as a result of detecting a payment object such as a credit card, detection of a customer device via NFC antenna 218, etc.

Typically, design voids having a 5 mm×10 mm×10 mm dimension or bigger, can be used to insert "off the shelf" bugs inside payment object reader 200. However, for utilizing design voids with lower dimension, custom made bugs need to be built and used, which adds complexity and reduces scalability of such scheme to insert bugs in hundreds or thousands of such payment objects readers.

Figure 4:
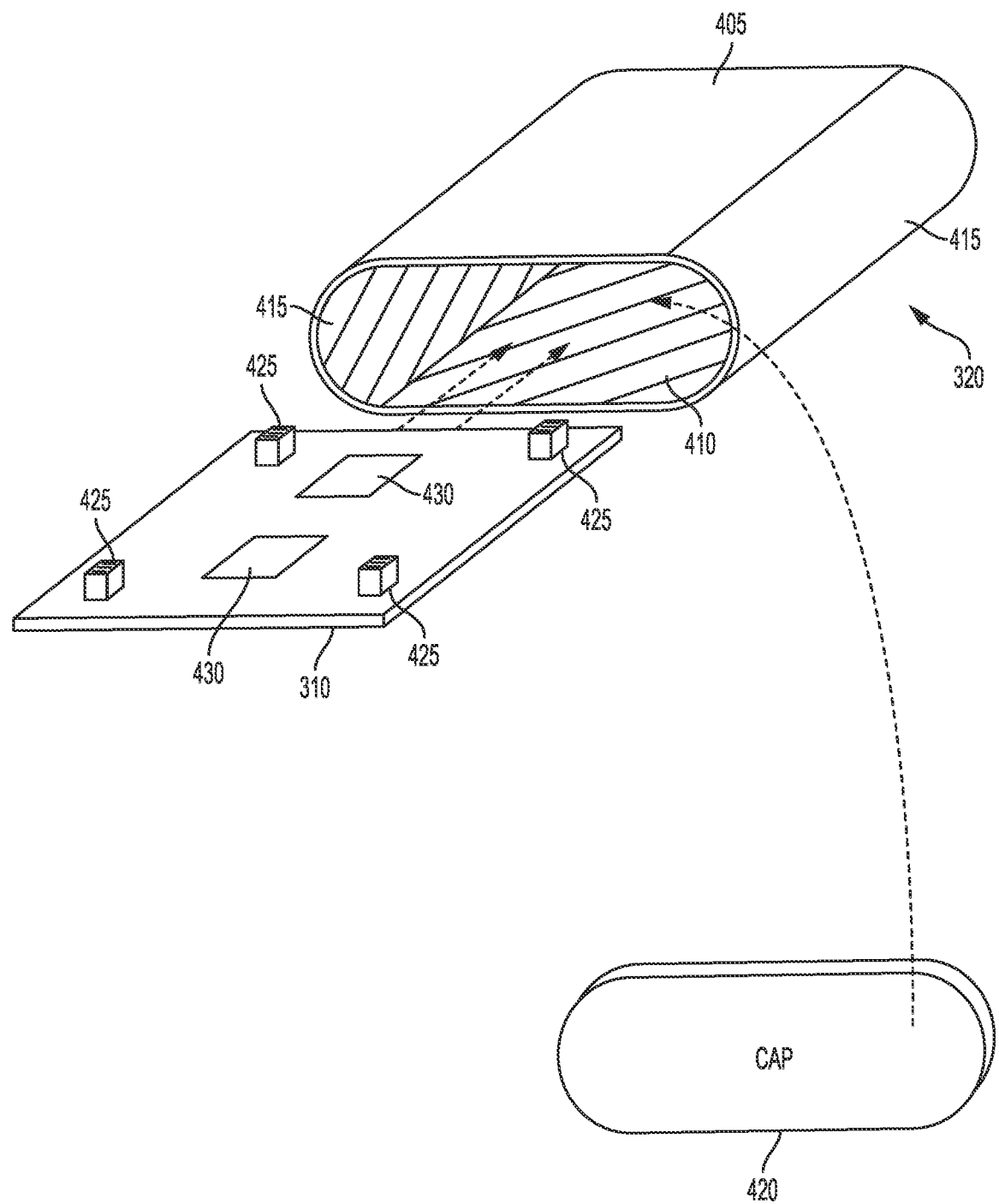
FIG. 4 illustrates a configuration of a security housing around a PCB, according to an aspect of the present disclosure.

FIG. 4 illustrates a configuration of a security housing around a PCB, according to an aspect of the present disclosure.

As shown in FIG. 4, example security housing 320 has a top portion 405, a bottom portion 410, side portions 415, a back portion (not shown) and a cap 420. In one example, PCB 310 fits within security housing 320 and connected thereto via connector pieces 425. As shown in FIG. 3, PCB 310 can have one or more electronic components 430, such as various components of payment object reader 200 described above with reference to FIG. 2, installed thereon.

Security housing 320 can have tamper mesh traces running through inner surfaces thereof (e.g., in a zigzag or boustrophedonic pattern, for example), which can in turn be connected to a tamper detection circuit on PCB 310, via connectors 425) for detecting any physical tampering therewith (e.g., drilling through security housing 320, by attempting to reroute current within the tamper detection circuit, or by flooding a portion of the tamper detection circuit with conductive ink). Operations of tamper mesh traces and tamper detection circuit are further described in U.S. application Ser. No. 15/250,460 filed on Aug. 29, 2016, the entire content of which is incorporated herein by reference.

Security housing 320 can also be referred to as a tamper cage, a security cage, or simply a shell. Security housing 320 can have non-conductive portions made from plastic, such as thermoplastics manufactured using Laser Direct Structuring (LDS), or from other non-conductive materials. The non-conductive portions of security housing 320 can be fused to each other and/or to the non-conductive board of the PCB 310 to prevent opening the security housing, or can alternately be affixed with glue, cement, or other adhesives. The non-conductive portions of PCB 310 are typically hard but can in some cases have a degree of flexibility. Tamper traces (not shown), which are used in conjunction with tamper detection circuit (not shown but can be anti-tamper module 220 of FIG. 2) can be laid out over the inside surfaces of top portion 405, bottom portion 410 and/or side portions 415 of security housing 320 during an LDS manufacturing process, if LDS is used.

Figure 5A:
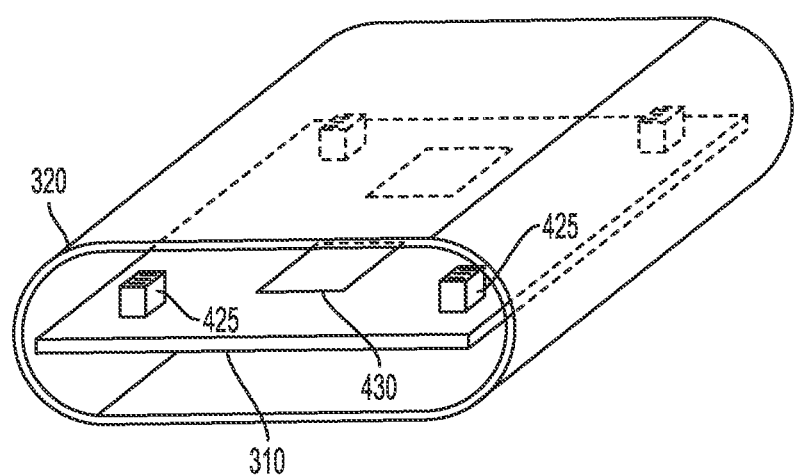
FIG. 5A illustrates a placement of a PCB inside a security housing, according to an aspect of the present disclosure.
Figure 5B:
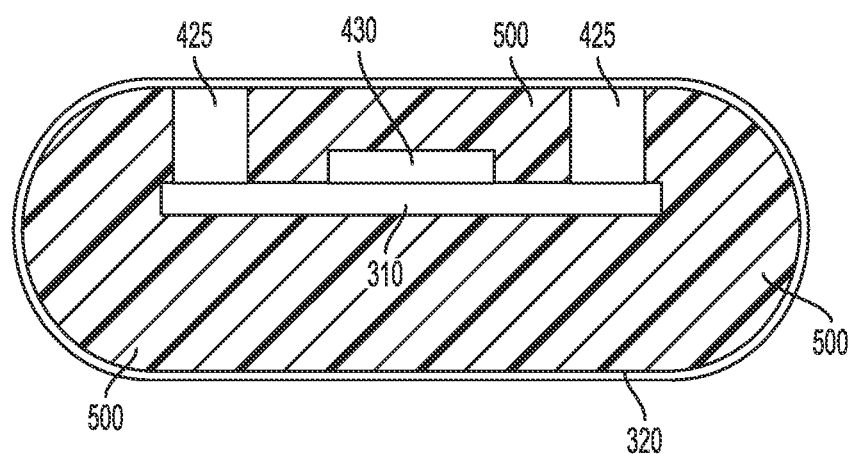
FIG. 5B illustrates a cross section of a security housing with a PCB placed therein, according to one aspect of the present disclosure.

FIG. 5A illustrates a placement of a PCB inside a security housing, according to an aspect of the present disclosure. FIG. 5 illustrates a transparent view of security housing 320 once PCB 310 is inserted therein and connected to PCB 320 via connectors 425. FIG. 5B illustrates a cross section of a security housing with a PCB placed therein, according to one aspect of the present disclosure. The illustrated cross section of FIG. 5B is along a width of security housing 320 of FIG. 5A from one side portion 415 to the opposite side portion 415.

As can be seen from FIG. 5B, once PCB 310 is placed inside security housing 320, there are design voids between the inner sides of security housing 320 and the PCB 310, connectors 425 and components 430 installed on PCB 310. In FIG. 5B, these design voids are illustrated as spaces 500 using diagonal dash lines.

In FIGS. 5A and B, PCB 310 is shown as being placed in a middle of the empty space inside security housing 320. However, the present disclosure is not limited to such placement of PCB 310 in the middle of the empty space inside security housing 320 but, for example, can be placed such that OCB 310 sits directly on top of the inner surface of bottom portion 410 of security housing 320. Furthermore, PCB 310 can be wide enough such that when it is placed inside security housing 320, the width thereof substantially covers the width of security housing 320 from one side portion 415 to another.

While through FIGS. 5A-B some examples of design voids and how they are created are shown, design voids within payment object reader 200 are not limited thereto. For example, design voids can be created between the outer walls of security housing 320 and the housing 302 to create design voids such as empty spaces 318 shown in FIG. 3. Another example of a design void is the opening 316 shown in FIG. 3.

As described herein, one objective of the present disclosure is to reduce and/or eliminate these design voids within payment object reader 200. While payment object reader 200 is used as an example of an assembly with design voids, the present disclosure is not limited thereto. In other words, any other device or component of a POS system that receives sensitive financial and personal information of customers and merchants and is susceptible to insertion of bugs to steal such information can be modified according to examples described hereinafter in order to reduce and/or eliminate any air-filled spaces therein. Furthermore, the present disclosure is equally applicable to any other device that has a security housing with design voids created therein after respective components are installed therein, including but not limited to, access card readers, electronic ignition systems, laptops, handheld devices, mobile phones, computers, medical equipment, security cameras, Automated Teller Machines (ATMs), electrical power grid sensors, oil rig sensors, etc.

Several examples will be described hereinafter according to which design voids can be eliminated and/or reduced to be at least smaller than a 5 mm×10 mm×10 mm, if not substantially eliminated.

In one example, design voids can be partially and/or completely filled with what is referred to as tamper solids. There can be different forms of tamper solids such as an electrical circuit, inert material such as plastic, glue, various types of potting material including semiconductive potting material, etc., all of which will be described below.

Figure 6:
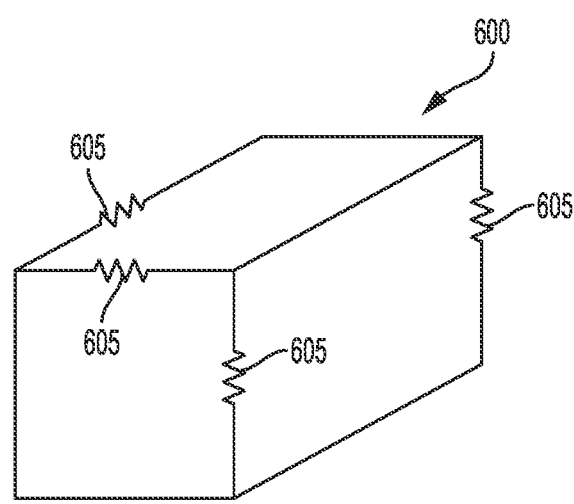
FIG. 6 is an example of a tamper solid for filling design voids, according to an aspect of the present disclosure.

FIG. 6 is an example of a tamper solid for filling design voids, according to an aspect of the present disclosure.

As shown in FIG. 6, structure 600 can be a 3-dimensional structure comprising a series (and/or alternatively parallel) connection of resistors 605. In one example, each resistor 605 can have a resistance value of zero or a non-zero value. In one example, a zero value (zero ohm) resistor refers to any resistor or any electronic component having a resistant that is near zero and less than a threshold (e.g., any resistor or any electronic component having a resistance of less than 50 milliohms (mΩ)). FIG. 6 is just one example of a configuration/structure of a 3-dimensional tamper solid. However, any other type of structure or configuration of electrical components can be used as tamper solids (e.g., a two or three dimensional configuration of resistors, capacitors, inductors, conductors, etc.).

Figure 7A:
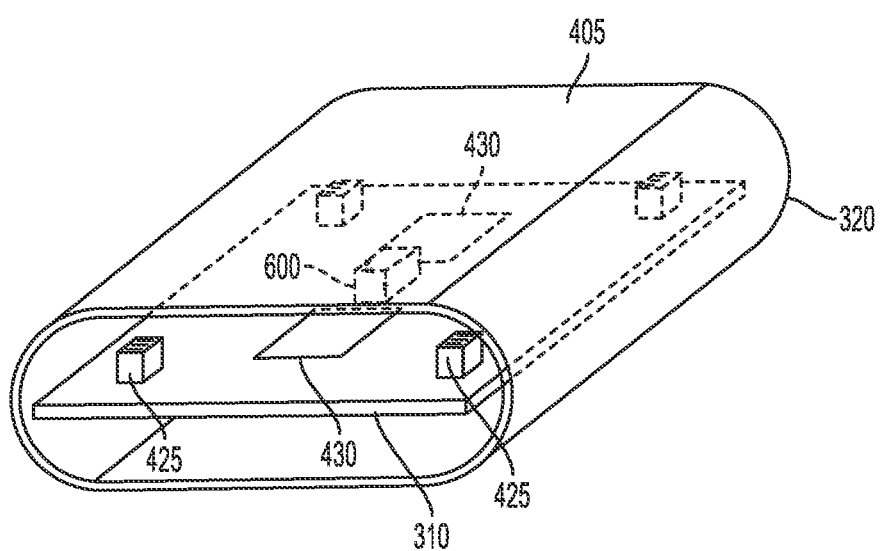
FIG. 7A illustrates a transparent view of a security housing with a tamper solid installed therein for filling design voids, according to one aspect of the present disclosure.

FIG. 7A illustrates a transparent view of a security housing with a tamper solid installed therein for filling design voids, according to one aspect of the present disclosure. As shown in FIG. 7A, PCB 310 (having components 430 installed thereon) is placed inside security housing 320. Furthermore, through a transparent view, via top portion 405 of security housing 320, it is shown that tamper solid 600 of FIG. 6 is installed on PCB 310 and protrudes therefrom toward top portion 405 of security housing 320. Tamper solid 600 can be connected to a tamper detection circuit (e.g., anti-tamper module 220 of FIG. 2) on PCB 310. Such circuitry, can be configured to detect a known voltage across tamper solid 600 and therefore, in case one of resistors 605 are broken due to a physical tampering (e.g., breaking into security housing 320), a change in the known voltage (or a short circuit) would be detected resulting in a detection of tampering and triggering a process for disabling payment object reader 200 (e.g., wiping its encryption keys, etc.).

While in FIG. 7A, only one tamper solid 600 is shown as being installed in a design void between two components 430 and top portion 405, one or more additional tamper solids (of exact same size or similar size depending on dimension of each design void) can be installed in other design voids inside security housing 320.

Figure 7B:
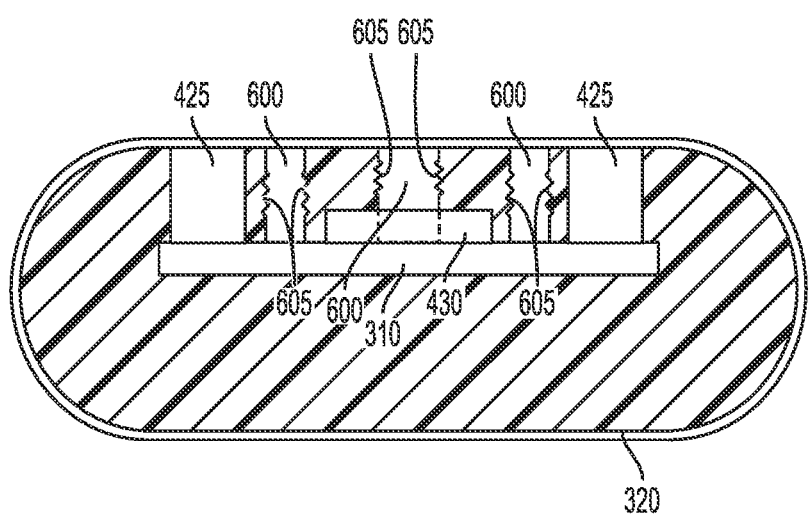
FIG. 7B illustrates a cross section of a security housing with a tamper solid installed therein, according to an aspect of the present disclosure.

FIG. 7B illustrates a cross section of a security housing with a tamper solid installed therein, according to an aspect of the present disclosure. FIG. 7B illustrates the same structure as FIG. 5B described above with the exception that in FIG. 7B, three example tamper solids are installed on PCB 310 for filling design voids created between two connectors 425, PCB 310, component 430 and top portion of security housing 320. Three tamper solids are the same as tamper solid example 600 having a 3-dimensional structure. However, because FIG. 7B is a cross sectional view of FIG. 7A, tamper solids 600 are shown as two dimensional structures with two side resistors 605.

Comparing FIGS. 5B and 7B, one can readily see that the design void between connectors 425, PCB 310, component 430 and top portion 405 of security housing 320 is partially filled with tamper solids 600 in FIG. 7B such that at least no space large enough (e.g., larger than 5 mm×10 mm×10 mm) is left as a void.

In one example, instead of tamper solid structures 600, unitary resistors 605 can each be considered a tamper solid and individually (and vertically) installed between top portion 405 and PCB 310 and be connected to a tamper detection circuit, in a similar manner as described above.

While in FIGS. 7A and 7B only certain design voids are shown as being filled with tamper solids, other design voids (e.g., design void between PCB 310 and bottom portion 410 of security housing 320 or between sides of PCB 310 and side portions 415 of security housing 320) can similarly have tamper solids installed therein to reduce the size of such design voids.

In another example, instead of a three dimensional structure of tamper solid 600 of FIG. 6, there may be a series of electrical components such as resistors that run through design voids inside security housing 320 (e.g., horizontally or vertically). These electrical components (e.g., resistors) create a net of interconnected electrical components such that if a physical tampering attempt is made to break into security housing 320 to access electrical components on PCB 310 and/or to install bugs, it would have to break one or more of such nested network of electrical components, which would trigger a detection of a tampering event and result in disabling of payment object reader 200 and/or corresponding POS device.

As mentioned above, in addition to design voids described with reference to FIGS. 5A-B and 7A-B, there can be design voids between security housing 320 and housing 302 of payment object reader 200 or within the opening 316 of FIG. 3. Tamper solids such as tamper solid 600 can be installed therein and connected to one or more conducting points on outer surfaces of security housing 320, which would in turn allow the tamper solids to be connected to tamper detection circuit (e.g., anti-tamper module 220 of FIG. 2) on PCB 310 for controlling thereof and detection of a physical tampering with payment object reader 200.

As briefly mentioned above, other examples of tamper solids include inert material that can also be used to fill design voids. Such inter material can include, but is not limited to, plastics, glues and/or any known or to be developed potting material. In one example, such inert material upon dispensing thereof, expands and becomes rigid so as to completely or partially occupy the design voids. Such inert material does not interfere with operation of electrical components of payment object reader on PCB 310.

Figure 7C:
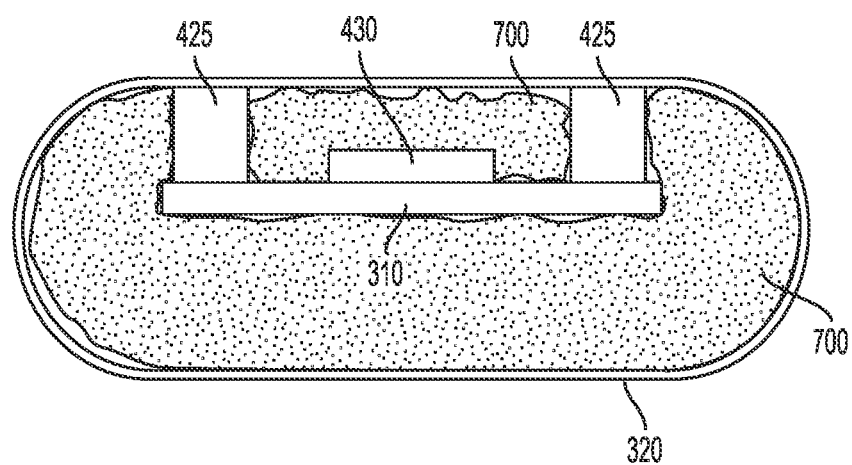
FIG. 7C illustrates an example of filling design voids with inter material, according to an aspect of the present disclosure

FIG. 7C illustrates an example of filling design voids with inter material, according to an aspect of the present disclosure. FIG. 7C is the same structure as that shown in FIG. 5B and described above with the exception of design voids 500 being filled with inert material 700. Inert material 700 can partially, substantially and/or completely fill design voids 500. In FIG. 7C inert material 700 are shown to have substantially covered design voids 500 for ease of illustration.

In one example, in addition to design voids 500 inside security housing 320 shown in FIG. 5B, design voids between security housing 320 and housing 302 and/or opening 316 can also be filled with inert material 700.

As described above, inert material 700 can be plastic, glue or potting material. In one example, potting material can be semiconductive potting material such as RTV silicone.

In one example, one or more capacitors can be placed on each end of PCB 310 (or at multiple points across PCB 310) to measure capacitance across semiconductive potting material 700 such as RTV silicone, such that if a physical tampering is detected, capacitance thereof is changed and such change is detected by tamper detection circuit (e.g., anti-tamper module 220 of FIG. 2) on PCB 310. In one example, as a number of such capacitors and placement thereof on PCB 310 is increased, it is possible to better determine (better pinpoint) the location of tampering (e.g., drilling location) within security housing 320 and more generally within payment object reader 200.

In this context, a physical tampering would be a physical alteration of semiconductive potting material deposited within design voids (e.g., chipping away at semiconductive potting material) to make room for inserting a bug.

On example advantage of filling design voids with potting material is that it results in the entire structure of payment object reader 200 to be more rigid and less susceptible to fluctuations in humidity, temperature, etc. Such rigidness also reduces the risk of damaging (physical damage) payment object reader 200 in case of, for example, dropping payment object reader 200, stepping on payment object reader 200, etc.

In one example, during the processing of manufacturing PCB 310, empty spaces or design voids can be filled with tamper meshes etched thereon. For example, on various locations on PCB 310 above which, after installment inside security housing 320, design voids are created, three-dimensional structures such as tamper meshes (e.g., cubic shaped structures) can be etched so as to reduce/eliminate such design voids and/or provide a tamper detecting element that detects tampering with payment object reader 200 upon drilling into security housing 320.

In each of the examples described above, security housing 320 is provided that covers PCB 310 and its components completely and serves as an additional cover (an intermediate cover) between PCB 310 and housing 302.

In another example, housing 320 can be such that instead of completely covering PCB 310 (all around) it can be a "half structure" such that security housing 320 covers the top surface of PCB 310 and design voids are created therein.

In this case, security housing 320 no longer has a bottom portion 410 and PCB 310 serves as the bottom of an assembly that includes PCB 310, components 430 and "half structure" 310 covering the same on top. Various design voids and filling thereof using tamper solids and inter material as described above with reference to FIGS. 5A-7C, are equally applicable to such "half structure" 320 covering PCB 310 inside housing 302.

In another example, security housing 320 can be removed and PCB 310 and its components can be placed inside housing 302 with design voids being created between inner walls of housing 302 and PCB 310. Various design voids and filling thereof using tamper solids and inter material as described above with reference to FIGS. 5A-7C, are equally applicable to PCB 310 inside housing 302 without security cage 320.

Figure 8:
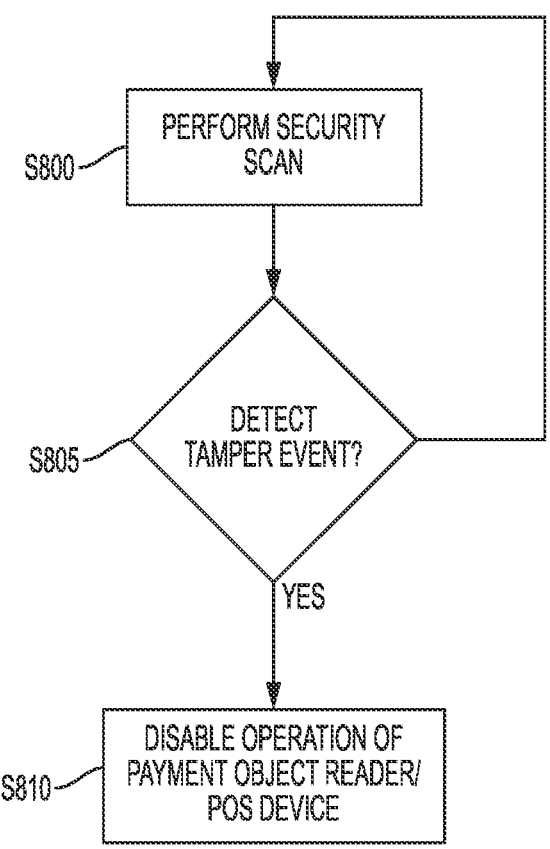
FIG. 8 illustrates a process of detecting a tampering event, according to an aspect of the present disclosure.

FIG. 8 illustrates a process of detecting a tampering event, according to an aspect of the present disclosure. FIG. 8 will be described from the perspective of a microcontroller of a tamper detection circuit, which can be anti-tamper module 220 of FIG. 2. Anti-tamper module can be referred to as a controller 220 hereinafter. Alternatively, functionalities of anti-tamper module 220 can be incorporated (programmed) into microcontroller 202 and microcontroller 202 can perform the functions described below with reference to FIG. 8.

At S800, controller 220 performs a security scan of payment object reader 200. In one example, controller 220 performs the security scan at every predetermined interval (e.g., once every few minutes, once every hour, once every 24 hours, etc.).

In one example such security scan can be measurement of a voltage across gap-filling circuitry as described above. In another example, the security scan can be a measurement of resistance across the gap-filling circuitry placed in design voids, as described above. In this example, upon detecting a resistance value that deviates from a threshold (pre-set or known) resistance value, an indication of tampering with the payment object reader 200 can be provided by controller 220. For example and as described above, tamper solid 600 can be a zero ohm structure, where each resistor 605 has a resistance value of zero and/or is a zero value (zero ohm) resistor/component, as defined above. Accordingly, detection of a non-zero resistance value (e.g., a large value or infinity indicating an open circuit (broken resistor)), can be indicative of tampering with payment object reader 200.

In another example, gap-filling circuitry can be a structure formed of one or more capacitors. Accordingly, a detection of tampering is based on a measurement of capacitance across the one or more capacitors and a comparison thereof with a threshold (pre-set or known) capacitance value. Alternatively, the measurement of capacitance can be across the semiconductive potting material as described above, etc.

In another example, gap-filling circuitry can be a structure formed of one or more inductors. Accordingly, a detection of tampering is based on a measurement of inductance of the one or more inductors (e.g., coils, etc.) and a comparison thereof with a threshold (pre-set or known) inductance value. Such inductance value can change if a coil is cut, deformed due to insertion of a bug or malicious circuit, etc.

In another example, gap-filling circuitry can be a structure formed of a combination of the above examples of gap-filling circuitry. For example, gap-filling circuitry can be a combination of one or more resistors, capacitors and/or coils and a detection of tampering can be based on a measurement of corresponding resistance, voltage, capacitance and/or inductance of the resistor(s), capacitor(s) and/or coil(s) of the gap-filling circuitry and comparison thereof to corresponding threshold(s).

Resistance, voltage, inductance and capacitance thresholds mentioned above, can be configurable parameters that can be set and/or adjusted based on experiments and/or empirical studies.

In another example, such security scan can be a continuous monitoring of one or more of voltage(s), resistance, inductance, and/or capacitance value(s), etc.

At S805, controller 220 determines if a tampering event is detected based on security scan performed at S800. For example, upon detecting a short circuit (e.g., due to a breaking of one or more resistors of tamper solid 600 described above), a change in voltage across resistors 605, capacitance across PCB 310, and/or resistance, inductance and capacitance values described above, controller 220 determines that payment object reader 200 has been tampered with. In one example, a change in voltage, inductance and/or capacitance is detected if such change deviates from a given voltage or capacitance value programmed into controller 220. As mentioned above, such short circuit, a break in the circuit, etc., may result from an attempt to physically intrude into payment object reader 200. Such intrusion may be attempted by a merchant or a customer engaging in a financial transaction using a POS device including payment object reader 200, another unauthorized agent attempting to plant a bug or a malware inside the POS device, etc.

As mentioned above, inert material can also be used to fill design voids, where such inert material can be different types of potting material such as plastic, glue, semiconductive potting material, etc. While measuring a change in a measured capacitance value of semiconductive potting material is described as a basis for detecting a tampering event by controller 220, in another example, there can be one or more optical receivers (e.g., one or more pinhole cameras) installed inside security housing 320 and/or 302. An optical receiver can scan the design voids or the potting material used for filling design voids, to detect any alteration and/or removal of parts (portions) and/or the entirety of the potting material. Detection of such alternation and/or removal of parts or entirety of potting material, results in controller 220 detecting a tampering event.

If at S805, controller 220 detects a tampering event, then at S810, controller 220 automatically self-destructs itself (disables payment object reader 200) so that payment object reader 220 (and more generally corresponding POS device such as mobile device 116) will become inoperable. While rendering payment object reader 200 inoperable is one example of disabling at S805, disabling also includes deleting encryption keys stored on payment object reader 200 for purposes of conducting transactions (e.g., financial transactions), rendering POS device incapable of processing transactions (e.g., financial transactions), etc. Thereafter, the process ends.

However, if at S805 and based on a result of the security scan, controller 220 determines that payment object reader 200 is not been tampered with, the process reverts back to S800 and controller 220 repeats S800 to S800 to S810 according a predetermined schedule of scans or on a continuous basis, as described above.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in a non-volatile memory or applications stored in magnetic/non-magnetic storage (e.g., flash and solid state storage devices, etc.), which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

Figure 9:
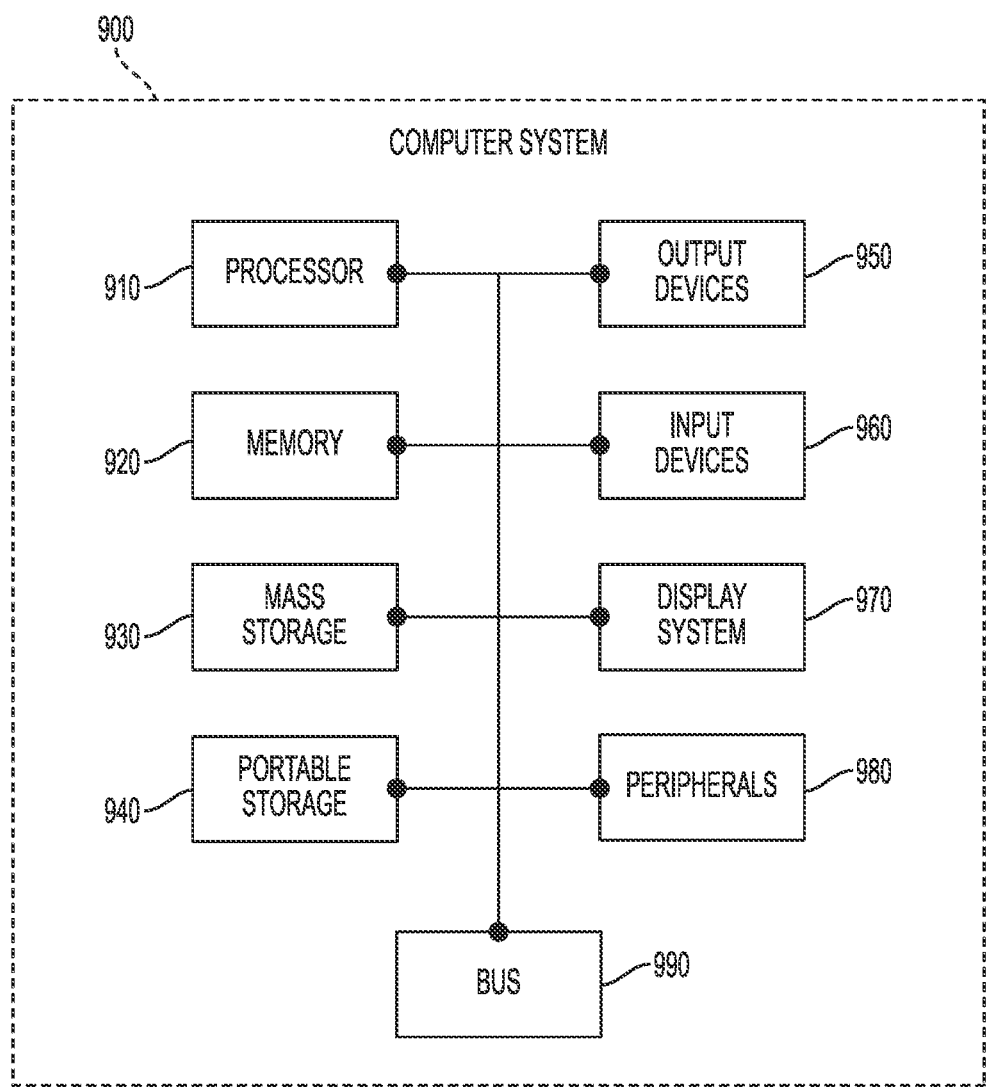
FIG. 9 illustrates an example computing system to implement the POS device of FIG. 1 and/or FIGS. 4 and 5, according to an aspect of the present disclosure.

FIG. 9 illustrates an example computing system to implement the POS device of FIG. 1, according to an aspect of the present disclosure. For example, any of the computer systems or computerized devices described herein may include at least one computing system 900, or may include at least one component of the computer system 900 identified in FIG. 9. The computing system 900 of FIG. 9 includes one or more processors 910 and memory 910. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 590. However, the components may be connected through one or more data transport means. For example, processor 910 and main memory 920 may be connected via a local microprocessor bus, and mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor 910. Mass storage device 930 can store the system software for implementing embodiments of the present invention for purposes of loading that software into main memory 910.

Portable storage device 940 operates in conjunction with a portable non-volatile storage medium, such as a compact disk or Digital video disc, to input and output data and code to and from the computer system 900 of FIG. 9. The system software for implementing embodiments of the present invention may be stored on such a portable medium and input to the computer system 900 via the portable storage device 940.

Main memory 920, mass storage device 930, or portable storage 940 can in some cases store sensitive information, such as transaction information, health information, or cryptographic keys, and may in some cases encrypt or decrypt such information with the aid of the processor 910. Main memory 920, mass storage device 930, or portable storage 940 may in some cases store, at least in part, instructions, executable code, or other data for execution or processing by the processor 910.

Output devices 950 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 970. The printer may be inkjet, laser/toner based, thermal, or some combination thereof. In some cases, the output device circuitry 950 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 550 may include any ports, plugs, antennae, or any other components necessary for the communication types listed above, such as cellular Subscriber Identity Module (SIM) cards.

Input devices 960 may include circuitry providing a portion of a user interface. Input devices 960 may include an alpha-numeric keypad, such as a keyboard, for inputting alpha-numeric and other information, or a pointing device, such as a mouse, a trackball, stylus, or cursor direction keys. Input devices 960 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 560 may include any ports, plugs, antennae, or any other components necessary for the communication types listed above, such as cellular SIM cards.

Display system 970 may include a liquid crystal display (LCD), a plasma display, an organic light-emitting diode (OLED) display, an electronic ink or "e-paper" display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 900 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 900 may be part of a multi-computer system that uses multiple computer systems 900, each for one or more specific tasks or purposes. For example, the multi-computer system may include multiple computer systems 900 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 500 from different networks communicatively coupled together via the internet (also known as a "distributed" system).

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, non-volatile memory, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Examples of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

We claim:

1. A POS device comprising:
   a terminal; and
   a payment object reader coupled to the terminal and configured to receive payment information from a payment object for processing of a transaction between a merchant and a customer, the payment object reader having at least one design void and comprising:
   a tamper detection circuit configured to fit within the at least one design void to prevent physical installation of unauthorized objects within the at least one design void; and
   a controller configured to communicate with the tamper detection circuit to detect a tampering event based on a change of state in the tamper detection circuit.

2. The POS device of claim 1, wherein the at least one design void is between a printed circuit board of the payment object reader and a housing of the payment object reader.

3. The POS device of claim 1, wherein the tamper detection circuit does not interfere with operation of the payment object reader for receiving and processing the payment information.

4. The POS device of claim 1, wherein the controller is configured to detect the tampering event by scanning the payment object reader.

5. The POS device of claim 4, wherein the scanning includes measuring a voltage across the tamper detection circuit.

6. The POS device of claim 4, wherein the scanning includes measuring a resistance across the tamper detection circuit.

7. The POS device of claim 6, wherein the controller is configured to detect the tampering event by comparing the resistance measured to a threshold.

8. The POS device of claim 4, wherein the scanning includes measuring a capacitance across one or more capacitors of the tamper detection circuit.

9. A payment object reader configured to receive payment information from a payment object for processing of a transaction between a merchant and a customer, the payment object reader having at least one design void and comprising:
   a tamper detection circuit configured to fill the at least one design void to prevent physical installation of unauthorized objects within the at least one design void; and
   a controller configured to communicate with the tamper detection circuit to detect a tampering event based on a change of state in the tamper detection circuit.

10. The payment object reader of claim 9, wherein the at least one design void is between a printed circuit board of the payment object reader and a housing of the payment object reader.

11. The payment object reader of claim 9, wherein the tamper detection circuit does not interfere with operation of the payment object reader for receiving and processing the payment information.

12. The payment object reader of claim 9, wherein the controller is configured to detect the tampering event by scanning the payment object reader.

13. The payment object reader of claim 12, wherein the scanning includes measuring a voltage across the tamper detection circuit.

14. The payment object reader of claim 12, wherein the scanning includes measuring a resistance across the tamper detection circuit.

15. The payment object reader of claim 12, wherein the scanning includes measuring a capacitance across one or more capacitors of the tamper detection circuit.

16. A point of sale system comprising:
   the payment object reader of claim 9; and
   a terminal communicatively coupled to the payment object reader.

* * * * *